US009702696B2

(12) United States Patent
Kobayashi

(10) Patent No.: US 9,702,696 B2
(45) Date of Patent: Jul. 11, 2017

(54) ANGULAR VELOCITY SENSOR

(71) Applicant: Panasonic Intellectual Property Management Co., Ltd., Osaka (JP)

(72) Inventor: Yasunobu Kobayashi, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 111 days.

(21) Appl. No.: 14/432,755

(22) PCT Filed: Oct. 11, 2013

(86) PCT No.: PCT/JP2013/006080
§ 371 (c)(1),
(2) Date: Apr. 1, 2015

(87) PCT Pub. No.: WO2014/061247
PCT Pub. Date: Apr. 24, 2014

(65) Prior Publication Data
US 2015/0253139 A1    Sep. 10, 2015

(30) Foreign Application Priority Data

Oct. 19, 2012    (JP) ................................. 2012-231384

(51) Int. Cl.
*G01C 19/56*    (2012.01)
*G01C 19/5656*    (2012.01)
*G01C 19/574*    (2012.01)

(52) U.S. Cl.
CPC ....... *G01C 19/5656* (2013.01); *G01C 19/574* (2013.01)

(58) Field of Classification Search
CPC ......................... G01C 19/5656; G01C 19/574
(Continued)

(56) References Cited

U.S. PATENT DOCUMENTS 6,186,003 B1    2/2001    Kikuchi et al.
6,227,048 B1    5/2001    Kikuchi et al.
(Continued)

FOREIGN PATENT DOCUMENTS

JP    11-281372    10/1999
JP    2010-169498    8/2010
(Continued)

OTHER PUBLICATIONS

International Search Report issued Nov. 5, 2013 in International (PCT) Application No. PCT/JP2013/006080.

*Primary Examiner* — John Chapman, Jr.
(74) *Attorney, Agent, or Firm* — Wenderoth, Lind & Ponack, L.L.P.

(57) ABSTRACT

An angular velocity sensor includes a fixing section to be fixed to an object, first and second connection beams each having one end connected to the fixing section, first and second double-end-supported beams, first and second driving electrodes to vibrate the supported beams, and first and second sensing electrodes to detect vibrations of the supported beams. The first supported beam has its ends connected to second ends of the first and second connection beams. The first supported beam, the first connection beam, and the second connection beam surround one side surface of the fixing section. The second supported beam has its ends connected to second ends of the first and second connection beams. The second double-end-supported beam, the first connection beam, and the second connection beam surround another side surface of the fixing section opposite the one side surface of the fixing section.

5 Claims, 7 Drawing Sheets

(58) Field of Classification Search
USPC .................................................... 73/504.12
See application file for complete search history.

(56) References Cited

U.S. PATENT DOCUMENTS

| | | |
|---|---|---|
| 6,651,498 B1 | 11/2003 | Kikuchi et al. |
| 2001/0001928 A1 | 5/2001 | Kikuchi et al. |
| 2009/0064783 A1 | 3/2009 | Ohuchi et al. |
| 2011/0179869 A1 | 7/2011 | Kobayashi et al. |
| 2011/0283796 A1 | 11/2011 | Ohuchi et al. |
| 2013/0228012 A1 | 9/2013 | Ohuchi et al. |
| 2013/0239684 A1 | 9/2013 | Yamamoto |
| 2014/0026657 A1 | 1/2014 | Ohuchi et al. |

FOREIGN PATENT DOCUMENTS

| | | |
|---|---|---|
| WO | 2007/086337 | 8/2007 |
| WO | 2012/081457 | 6/2012 |

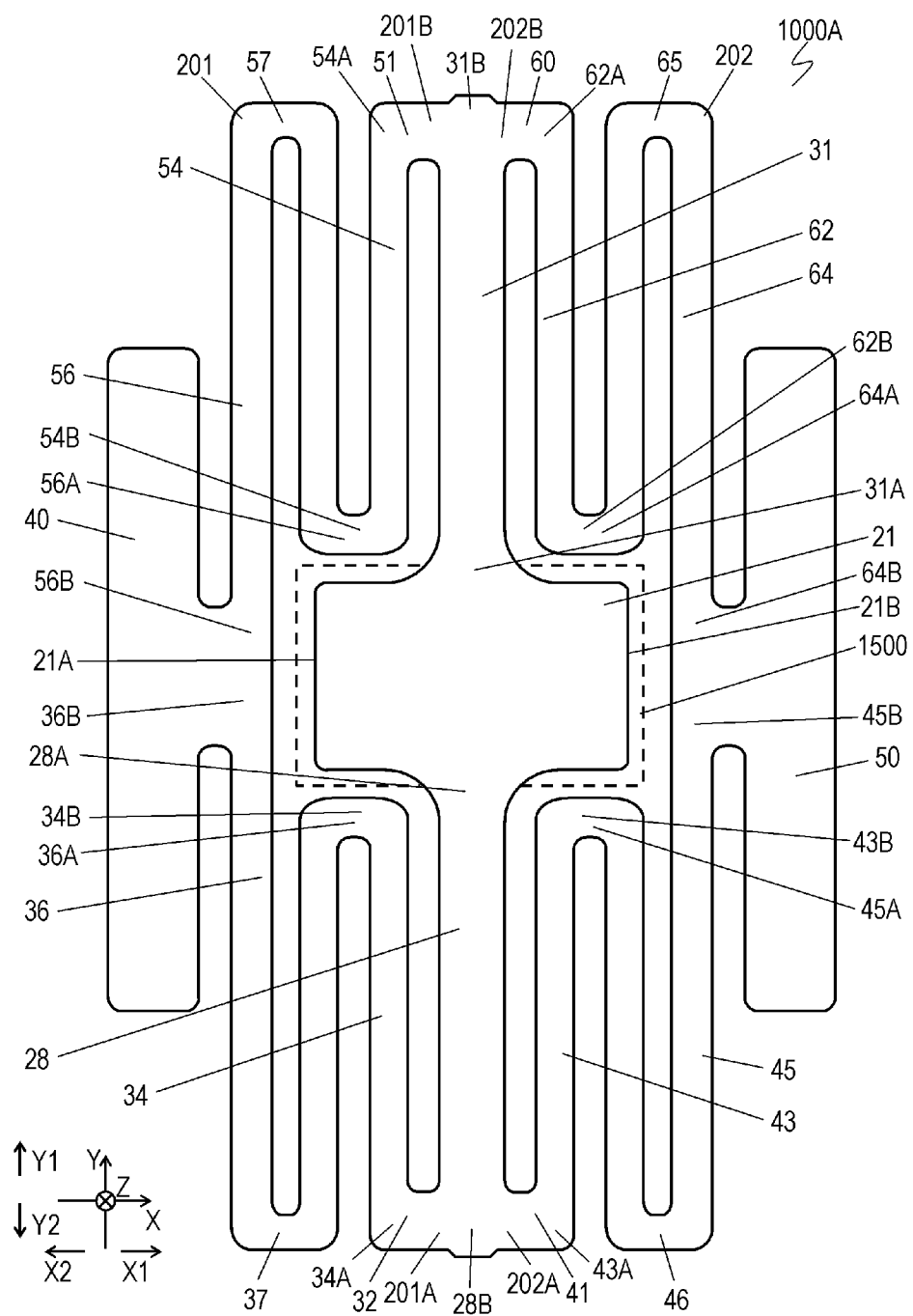

ANGULAR VELOCITY SENSOR

This application is a U.S. national stage application of the PCT international application No. PCT/JP2013/006080 filed on Oct. 11, 2013, which claims the benefit of foreign priority of Japanese patent application 2012-231384 filed on Oct. 19, 2012, the contents of all of which are incorporated herein by reference.

TECHNICAL FIELD

The present invention relates to an angular velocity sensor used for various electronic devices.

BACKGROUND ART

FIG. 5 is a perspective view of conventional angular velocity sensor 500 disclosed in PTL 1. Angular velocity sensor 500 includes fixing section 1 having a rectangular parallelepiped shape, sensing-electrode vibrating segment 2 having one end connected to fixing section 1, and sensing-electrode vibrating segment 3 having one end connected to fixing section 1 and extending opposite to sensing-electrode vibrating segment 2. Sensing-electrode vibrating segments 2 and 3 are made of piezoelectric single crystal. A sensing electrode is provided on an upper surface of sensing-electrode vibrating segment 2. A sensing electrode is provided on an upper surface of sensing-electrode vibrating segment 3. Bent section 4 extends from another end of sensing-electrode vibrating segment 2 perpendicularly in a left direction. One end of connection beam 5 is connected to bent section 4 and is bent perpendicularly in an X-axis direction. Driving-electrode vibrating segment 6 made of piezoelectric single crystal has one end connected to connection beam 5. A driving electrode is provided on an upper surface of driving-electrode vibrating segment 6. Bent section 7 extends from another end of sensing-electrode vibrating segment 2 perpendicularly in a right direction. Connection beam 8 has one end connected to bent section 7, and is bent perpendicularly in the X-axis direction. Driving-electrode vibrating segment 9 made of piezoelectric single crystal has one end connected to connection beam 8. A driving electrode is provided on an upper surface of driving-electrode vibrating segment 9. Bent section 10 extends from another end of sensing-electrode vibrating segment 3 perpendicularly in the left direction. Connection beam 11 has one end connected to bent section 10 and is bent perpendicularly in the X-axis direction. Connection beam 11 is connected to another end of driving-electrode vibrating segment 6. Bent section 14 extends from another end of sensing-electrode vibrating segment 3 perpendicularly in the right direction. Connection beam 15 has one end connected to bent section 14. Sensing-electrode vibrating segment 3 is bent perpendicularly in the X-axis direction. Another end of connection beam 15 is connected to another end of driving-electrode vibrating segment 9.

An operation of conventional angular velocity sensor 500 will be described below.

Upon having an alternating voltage applied to the driving electrodes provided on driving-electrode vibrating segments 6 and 9, driving-electrode vibrating segments 6 and 9 are driven to vibrate in a driving direction at velocity V. While driving-electrode vibrating segments 6 and 9 vibrate, angular velocity sensor 500 rotates at an angular velocity ω about a Z-axis perpendicular to a plane including angular velocity sensor 500, thus causing driving-electrode vibrating segment 6 to generate Coriolis force F(=2 mV×ω). Coriolis force F is transmitted to sensing-electrode vibrating segment 2 via connection beams 5 and 8 and bent sections 4 and 7, and is transmitted to sensing-electrode vibrating segment 3 via connection beam 11, connection beam 15, and bent sections 10 and 14. As a result, angular velocity sensor 500 outputs an output signal according to the angular velocity from the sensing electrodes provided on the upper surfaces of sensing-electrode vibrating segments 2 and 3. However, angular velocity sensor 500 may provide a small output signal generated due to Coriolis force F.

CITATION LIST

Patent Literature

PTL 1: Japanese Patent Laid-Open Publication No. 11-281372

SUMMARY

An angular velocity sensor includes a fixing section configured to be fixed to an object, a first connection beam having one end connected to the fixing section, a second connection beam having one end connected to the fixing section, first and second double-end-supported beams connected to another ends of the first and second connection beams, first and second driving electrodes configured to vibrate the first and second double-end-supported beams, first and second sensing electrodes configured to detect vibrations of the first and second double-end-supported beams. The first double-end-supported beam has one end connected to another end of the first connection beam and has another end connected to another end of the second connection beam. The first double-end-supported beam extends such that the first double-end-supported beam, the first connection beam, and the second connection beam surround one side surface of the fixing section. The second double-end-supported beam has one end connected to another end of the first connection beam, and has another end connected to another end of the second connection beam. The second double-end-supported beam extends such that the second double-end-supported beam, the first connection beam, and the second connection beam surround another side surface of the fixing section opposite to one side surface of the fixing section.

This angular velocity sensor has a high sensitivity.

BRIEF DESCRIPTION OF DRAWINGS

FIG. 1B is a top view of a sensor base of the angular velocity sensor in accordance with the embodiment.

DETAILED DESCRIPTION OF PREFERRED EMBODIMENT

Figure 1A:
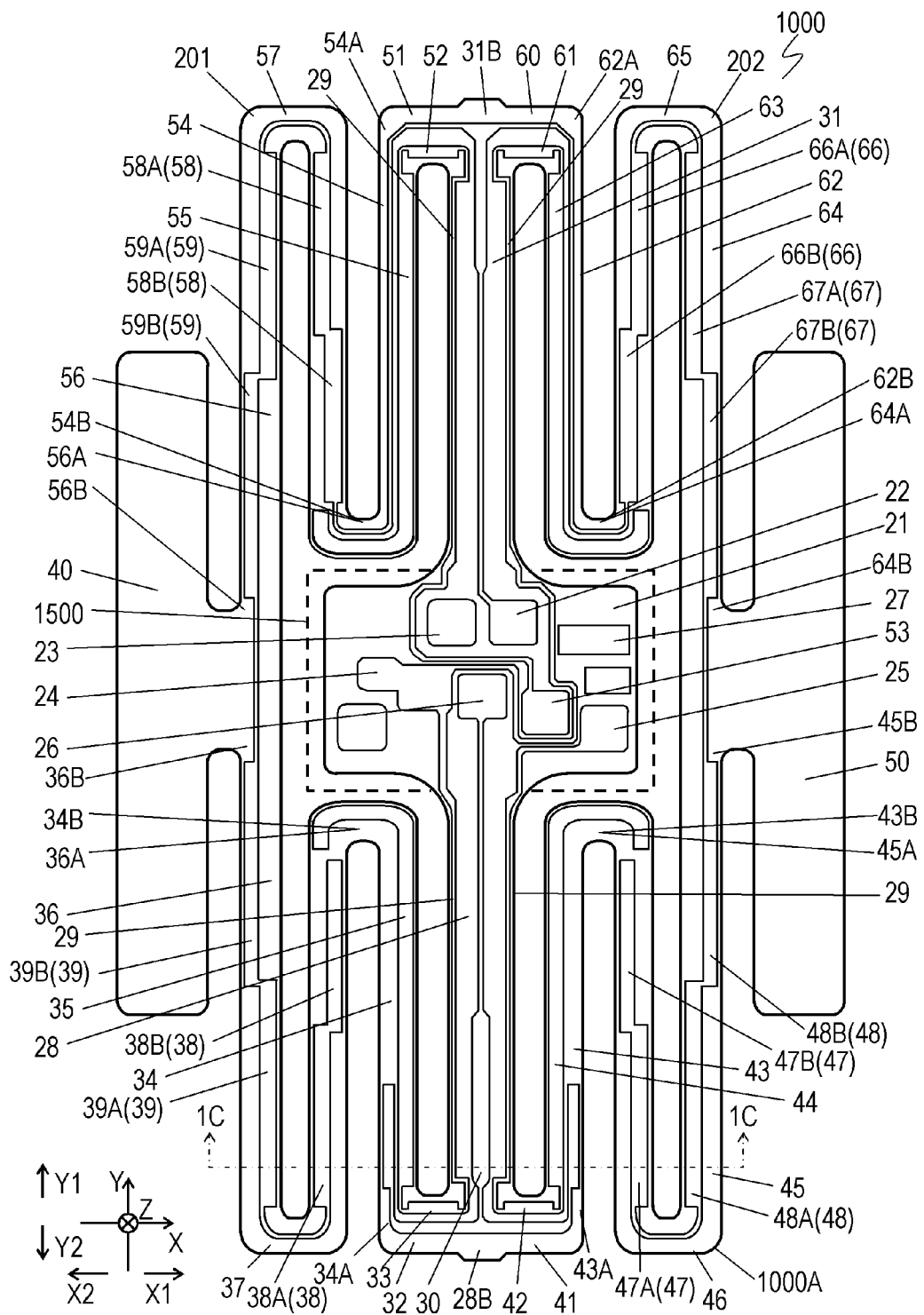
FIG. 1A is a top view of an angular velocity sensor in accordance with an exemplary embodiment of the present invention.

FIG. 1A is a top view of angular velocity sensor 1000 in accordance with an exemplary embodiment of the present invention. Angular velocity sensor 1000 is configures to be fixed to object 1500 and to detect an angular velocity applied to object 1500. Angular velocity sensor 1000 includes sensor base 1000A that is fixed to object 1500 and configured to vibrate; driving electrodes driven to vibrate sensor base 1000A; and sensing electrodes that detect a vibration of sensor base 1000A. Sensor base 1000A is made of silicon (Si). In FIG. 1A, an X-axis, a Y-axis, and a Z-axis perpendicular to one another are defined.

FIG. 1B is a top view of sensor base 1000A. Sensor base 1000A includes fixing section 21, connection beams 28 and 31, and double-end-supported beams 201 and 202. Double-end-supported beam 201 includes bent sections 32 and 51, sensing-electrode vibrating segments 34 and 54, and driving-electrode vibrating segments 36 and 56. Double-end-supported beam 202 includes bent sections 41 and 60, sensing-electrode vibrating segments 43 and 62, and driving-electrode vibrating segments 45 and 64. Fixing section 21 is configured to be fixed to object 1500. Even when fixing section 21 is fixed to object 1500, connection beams 28 and 31 and double-end-supported beams 201 and 202 are movable with respect to object 1500. Connection beam 28 has end 28A and end 28B opposite to end 28A. End 28A is connected to fixing section 21. Connection beam 31 has end 31A and end 31B opposite to end 31A. End 31A is connected to fixing section 21. Connection beam 31 extends opposite to connection beam 28. Double-end-supported beam 201 has ends 201A and 201B. End 201A is connected to end 28B of connection beam 28. End 201B is connected to end 31B of connection beam 31. Double-end-supported beam 201 extends such that double-end-supported beam 201 and connection beams and 31 surround side surface 21A of fixing section 21. Double-end-supported beam 202 has ends 202A and 202B. End 202A is connected to end 28B of connection beam 28. End 202B is connected to end 31B of connection beam 31. Double-end-supported beam 202 extends such that double-end-supported beam 202 and connection beams 28 and 31 surround side surface 21B of fixing section 21 opposite to side surface 21A of fixing section 21.

Fixing section 21 is positioned substantially at a center of the entire shape of angular velocity sensor 1000. Fixing section 21 has a rectangular parallelepiped shape, and is made of Si.

Connection beam 28 extends slenderly from end 28A connected to fixing section 21 to outside in direction Y2 (a longitudinal direction) that is a negative direction along the Y-axis. Connection beam 31 extends slenderly from end 31A connected to fixing section 21 to outside in direction Y1 (a longitudinal direction) opposite to direction Y2 in which connection beam 28 extends. A length of connection beam 28 in the longitudinal directions and a cross-sectional shape of connection beam 28 perpendicular to the longitudinal directions are substantially identical to a length of connection beam 31 in the longitudinal directions and a cross-sectional shape of connection beam 31 perpendicular to the longitudinal directions, respectively.

Bent section 32 extends from end 28B of connection beam 28 in direction X2 perpendicular to the longitudinal direction of connection beam 28. End 34 of sensing-electrode vibrating segment 34 is connected to bent section 32 and is coupled to end 28B of connection beam 28 via bent section 32. Sensing-electrode vibrating segment 34 extends from end 34A to end 34B in direction Y1. End 36A of driving-electrode vibrating segment 36 is connected to end 34B of sensing-electrode vibrating segment 34. Driving-electrode vibrating segment 36 extends from end 36A in direction Y2 and returns from bent section 37 to end 36B in direction Y1.

Bent section 41 extends from end 28B of connection beam 28 in direction X1 that is perpendicular to the longitudinal direction of connection beam 28 and that is opposite to direction X2. End 43A of sensing-electrode vibrating segment 43 is connected to bent section 41, and is coupled to end 28B of connection beam 28 via bent section 41. Sensing-electrode vibrating segment 43 extends from end 43A to end 43B in direction Y1. Driving-electrode vibrating segment 45 has end 45A connected to end 43B of sensing-electrode vibrating segment 43. Driving-electrode vibrating segment 45 extends from end 45A in direction Y2 and returns from bent section 46 to end 45B in direction Y1.

Bent section 51 extends from end 31B of connection beam 31 in direction X2 perpendicular to the longitudinal direction of connection beam 31. End 54A of sensing-electrode vibrating segment 54 is connected to bent section 51, and is coupled to end 31B of connection beam 31 via bent section 51. Sensing-electrode vibrating segment 54 extends from end 54A in direction Y2 to end 54B. Driving-electrode vibrating segment 56 has end 56A connected to end 54B of sensing-electrode vibrating segment 54. Driving-electrode vibrating segment 56 extends from end 56A in direction Y1 and returns from bent section 57 to end 56B in direction Y2.

Bent section 60 extends from end 31B of connection beam 31 in direction X1 that is perpendicular to the longitudinal direction of connection beam 31 and that is opposite to direction X2. End 62A of sensing-electrode vibrating segment 62 is connected to bent section 60, and is coupled to end 31B of connection beam 31 via bent section 60. Driving-electrode vibrating segment 64 has end 64A connected to end 62B of sensing-electrode vibrating segment 62. Driving-electrode vibrating segment 64 extends from end 64A in direction Y1 and returns from bent section 65 to end 64B in direction Y2.

Driving-electrode vibrating segment 36 has end 36B connected to end 56B of driving-electrode vibrating segment 56. Plummet 40 is connected to end 36B of driving-electrode vibrating segment 36 and end 56B of driving-electrode vibrating segment 56. Driving-electrode vibrating segment 45 has end 45B connected to end 64B of driving-electrode vibrating segment 64. Plummet 50 is connected to end 45B of driving-electrode vibrating segment 45 and end 64B of driving-electrode vibrating segment 64.

As shown in FIG. 1A, lands 22 to 27 and 53 are provided on an upper surface of fixing section 21.

Wiring pattern 29 and monitor electrode 30 are provided on an upper surface of connection beam 28. Monitor electrode 30 is electrically connected with wiring pattern 29 to land 26 on the upper surface of fixing section 21. Wiring pattern 29 is provided on an upper surface of connection beam 31.

Sensing electrode 33 is provided on an upper surface of bent section 32. Sensing electrode 33 is electrically connected via wiring pattern 29 to land 24 on the upper surface of fixing section 21. Sensing electrode 35 is provided on an upper surface of sensing-electrode vibrating segment 34. Sensing electrode 35 is electrically connected to land 24 on the upper surface of fixing section 21 via sensing electrode 33 and wiring pattern 29 on the upper surface of bent section 32. Driving electrodes 38 and 39 that are connected continuously to each other are provided on an upper surface of driving-electrode vibrating segment 36. Driving electrodes 38 and 39 are electrically connected via wiring pattern 29 to land 22 on the upper surface of fixing section 21.

Sensing electrode 35 provided on the upper surface of sensing-electrode vibrating segment 34 extends from wiring pattern 29 near end 34A of sensing-electrode vibrating segment 34 in direction Y1 along sensing-electrode vibrating segment 34 and extends beyond end 34B of sensing-electrode vibrating segment 34 in direction Y2 to a portion of driving-electrode vibrating segment 36. Sensing electrodes 33 and 35 are positioned closer to a side edge of driving-electrode vibrating segment 36 connected to an inner periphery of bent section 32 than to a side edge of sensing-electrode vibrating segment 34 connected to an outer periphery of bent section 32.

Driving electrode 38 is positioned between bent section 37 and end 36A of driving-electrode vibrating segment 36. Driving electrode 38 includes portions 38A and 38B that are arranged in direction Y1 (Y2) along the Y-axis and that are connected to each other. Portion 38A is closer to bent section 37 than portion 38B of driving electrode 38. Portion 38A of driving electrode 38 is closer to a side edge of driving-electrode vibrating segment 36 connected to an inner periphery of bent section 37 than to a side edge of driving-electrode vibrating segment 36 connected to an outer periphery of bent section 37. Portion 38B of driving electrode 38 is closer to a side edge of driving-electrode vibrating segment 36 connected to the outer periphery of bent section 37 than to the side edge of driving-electrode vibrating segment 36 connected to the inner periphery of bent section 37. Thus, portions 38A and 38B of driving electrode 38 form a crank shape of driving electrode 38.

Driving electrode 39 is positioned between bent section 37 and end 36B of driving-electrode vibrating segment 36. Driving electrode 39 includes portions 39A and 39B that are arranged in direction Y1 (Y2) along the Y-axis and that are connected to each other. Portion 39A is closer to bent section 37 than portion 39B of driving electrode 39. Portion 39A of driving electrode 39 is closer to the side edge of driving-electrode vibrating segment 36 connected to the inner periphery of bent section 37 than to the side edge of driving-electrode vibrating segment 36 connected to the outer periphery of bent section 37. Portion 39B of driving electrode 39 is closer to the side edge of driving-electrode vibrating segment 36 connected to the outer periphery of bent section 37 than to the side edge of driving-electrode vibrating segment 36 connected to the inner periphery of bent section 37. Thus, portions 39A and 39B of driving electrode 39 form a crank shape of driving electrode 39.

Sensing electrode 42 is provided on an upper surface of bent section 41. Sensing electrode 42 is electrically connected via wiring pattern 29 to land 25 on the upper surface of fixing section 21. Sensing electrode 44 is provided on an upper surface of sensing-electrode vibrating segment 43. Sensing electrode 44 is electrically connected via sensing electrode 42 and wiring pattern 29 to land 25 on the upper surface of fixing section 21. Driving electrodes 47 and 48 that are connected continuously to each other are provided on an upper surface of driving-electrode vibrating segment 45. Driving electrode 47 is electrically connected via wiring pattern 29 to land 22 on the upper surface of fixing section 21. Driving electrode 48 is electrically connected to land 22 via wiring pattern 29.

Sensing electrode 44 provided on the upper surface of sensing-electrode vibrating segment 43 extends from wiring pattern 29 near end 43A of sensing-electrode vibrating segment 43 in direction Y1 along sensing-electrode vibrating segment 43, and extends beyond end 43B of sensing-electrode vibrating segment 43 in direction Y2 to a portion of driving-electrode vibrating segment 45. Sensing electrodes 42 and 44 are closer to a side edge of driving-electrode vibrating segment 45 connected to an inner periphery of bent section 41 than to a side edge of sensing-electrode vibrating segment 43 connected to an outer periphery of bent section 41.

Driving electrode 47 is positioned between bent section 46 and end 45A of driving-electrode vibrating segment 45. Driving electrode 47 includes portions 47A and 47B that are arranged in direction Y1 (Y2) along the Y-axis and that are connected to each other. Portion 47A is closer to bent section 46 than portion 47B of driving electrode 47. Portion 47A of driving electrode 47 is closer to the side edge of driving-electrode vibrating segment 45 connected to the inner periphery of bent section 46 than to the side edge of driving-electrode vibrating segment 45 connected to the outer periphery of bent section 46. Portion 47B of driving electrode 47 is closer to the side edge of driving-electrode vibrating segment 45 connected to the outer periphery of bent section 46 than to the side edge of driving-electrode vibrating segment 45 connected to the inner periphery of bent section 46. Thus, portions 47A and 47B of driving electrode 47 form a crank shape of driving electrode 47.

Driving electrode 48 is positioned between bent section 46 and end 45B of driving-electrode vibrating segment 45. Driving electrode 48 includes portions 48A and 48B that are arranged in direction Y1 (Y2) along the Y-axis and that are connected to each other. Portion 48A is closer to bent section 46 than portion 48B of driving electrode 48. Portion 48A of driving electrode 48 is closer to the side edge of driving-electrode vibrating segment 45 connected to the inner periphery of bent section 46 than to the side edge of driving-electrode vibrating segment 45 connected to the outer periphery of bent section 46. Portion 48B of driving electrode 48 is closer to the side edge of driving-electrode vibrating segment 45 connected to the outer periphery of bent section 46 than to the side edge of driving-electrode vibrating segment 45 connected to the inner periphery of bent section 46. Thus, portions 48A and 48B of driving electrode 48 form a crank shape of driving electrode 48.

Sensing electrode 52 is provided on an upper surface of bent section 51. Sensing electrode 52 is electrically connected via wiring pattern 29 to land 53 on the upper surface of fixing section 21. Sensing electrode 55 is provided on an upper surface of sensing-electrode vibrating segment 54. Sensing electrode 55 is electrically connected to land 53 on the upper surface of fixing section 21 via sensing electrode 52 and wiring pattern 29 on the upper surface of bent section 51. Driving electrodes 58 and 59 that are connected continuously to each other are provided on the upper surface of driving-electrode vibrating segment 56.

Sensing electrode 55 provided on the upper surface of sensing-electrode vibrating segment 54 extends from wiring pattern 29 near end 54A of sensing-electrode vibrating segment 54 along sensing-electrode vibrating segment 54 in direction Y2, and extends beyond end 54B of sensing-electrode vibrating segment 54 in direction Y1 to a portion of driving-electrode vibrating segment 56. Sensing electrodes 52 and 55 are closer to the side edge of driving-electrode vibrating segment 56 connected to the inner periphery of bent section 51 than to the side edge of sensing-electrode vibrating segment 54 connected to the outer periphery of bent section 51.

Driving electrode 58 is positioned between bent section 57 and end 56A of driving-electrode vibrating segment 56. Driving electrode 58 includes portions 58A and 58B that are arranged in direction Y1 (Y2) along the Y-axis and that are connected to each other. Portion 58A is closer to bent section 57 than portion 58B of driving electrode 58. Portion 58A of driving electrode 58 is closer to the side edge of driving-electrode vibrating segment 56 connected to the inner periphery of bent section 57 than to the side edge of driving-electrode vibrating segment 56 connected to the outer periphery of bent section 57. Portion 58B of driving electrode 58 is closer to the side edge of driving-electrode vibrating segment 56 connected to the outer periphery of bent section 57 than to the side edge of driving-electrode vibrating segment 56 connected to the inner periphery of bent section 57. Thus, portions 58A and 58B of driving electrode 58 form a crank shape of driving electrode 58.

Driving electrode 59 is positioned between bent section 57 and end 56A of driving-electrode vibrating segment 56. Driving electrode 59 includes portions 59A and 59B that are arranged in direction Y1 (Y2) along the Y-axis and that are connected to each other. Portion 59A is closer to bent section 57 than portion 59B of driving electrode 59. Portion 59A of driving electrode 59 is closer to the side edge of driving-electrode vibrating segment 56 connected to the inner periphery of bent section 57 than to the side edge of driving-electrode vibrating segment 56 connected to the outer periphery of bent section 57. Portion 59B of driving electrode 59 is closer to the side edge of driving-electrode vibrating segment 56 connected to the outer periphery of bent section 57 than to the side edge of driving-electrode vibrating segment 56 connected to the inner periphery of bent section 57. Thus, portions 59A and 59B of driving electrode 59 form a crank shape of driving electrode 59.

Sensing electrode 61 is provided on an upper surface of bent section 60. Sensing electrode 61 is electrically connected via wiring pattern 29 to land 24 on the upper surface of fixing section 21. Sensing electrode 63 is provided on an upper surface of sensing-electrode vibrating segment 62. Sensing electrode 63 is electrically connected to land 24 on the upper surface of fixing section 21 via sensing electrode 61 and wiring pattern 29 on the upper surface of bent section 60. Driving electrodes 66 and 67 that are connected to each other are provided on an upper surface of driving-electrode vibrating segment 64. Driving electrode 66 electrically connected via wiring pattern 29 to land 22 on the upper surface of fixing section 21. Driving electrode 67 is electrically connected to land 22 via wiring pattern 29.

Sensing electrode 63 provided on the upper surface of sensing-electrode vibrating segment 62 extends from wiring pattern 29 near end 64A of sensing-electrode vibrating segment 62 along sensing-electrode vibrating segment 62 in direction Y2, and extends beyond end 62B of sensing-electrode vibrating segment 62 in direction Y1 to a portion of driving-electrode vibrating segment 64. Sensing electrodes 61 and 63 are closer to a side edge of driving-electrode vibrating segment 64 connected to an inner periphery of bent section 60 than to a side edge of sensing-electrode vibrating segment 62 connected to an outer periphery of bent section 60.

Driving electrode 66 is positioned between bent section 65 and end 64A of driving-electrode vibrating segment 64. Driving electrode 66 includes portions 66A and 66B that are arranged in direction Y1 (Y2) along the Y-axis and that are connected to each other. Portion 66A is closer to bent section 65 than portion 66B of driving electrode 66. Portion 66A of driving electrode 66 is closer to the side edge of driving-electrode vibrating segment 64 connected to the inner periphery of bent section 65 than to the side edge of driving-electrode vibrating segment 64 connected to the outer periphery of bent section 65. Portion 66B of driving electrode 66 is closer to the side edge of driving-electrode vibrating segment 64 connected to the outer periphery of bent section 65 than to the side edge of driving-electrode vibrating segment 64 connected to the inner periphery of bent section 65. Thus, portions 66A and 66B of driving electrode 66 form a crank shape of driving electrode 66.

Driving electrode 67 is positioned between bent section 65 and end 64B of driving-electrode vibrating segment 64. Driving electrode 67 includes portions 67A and 67B that are arranged in direction Y1 (Y2) along the Y-axis and that are connected to each other. Portion 67A is closer to bent section 65 than portion 67B of driving electrode 67. Portion 67A of driving electrode 67 is closer to the side edge of driving-electrode vibrating segment 64 connected to the inner periphery of bent section 65 than to the side edge of driving-electrode vibrating segment 64 connected to the outer periphery of bent section 65. Portion 67B of driving electrode 67 is closer to the side edge of driving-electrode vibrating segment 64 connected to the outer periphery of bent section 65 than to the side edge of driving-electrode vibrating segment 64 connected to the inner periphery of bent section 65. Thus, portions 67A and 67B of driving electrode 67 form a crank shape of driving electrode 67.

Figure 1C:
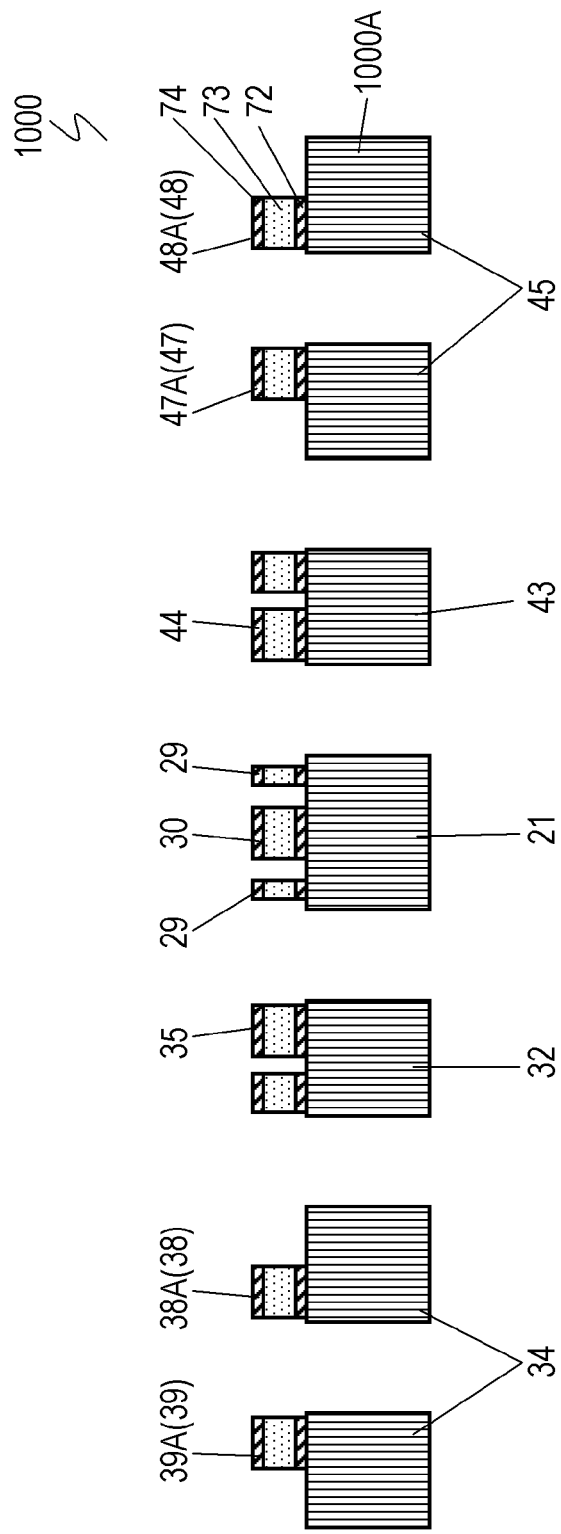
FIG. 1C is a cross-sectional view of the angular velocity sensor at line 1C-1C shown in FIG. 1A.

Structures of wiring pattern 29, the driving electrodes, the sensing electrodes, and the monitor electrodes will be described. FIG. 1C is a cross-sectional view of angular velocity sensor 1000 at line 1C-1C shown in FIG. 1A. Angular velocity sensor 1000 includes lower electrode layer 72 provided on an upper surface of sensor base 1000A, piezoelectric layer 73 made of piezoelectric material provided on an upper surface of lower electrode layer 72, and upper electrode layer 74 provided on an upper surface of piezoelectric layer 73 so as to face lower electrode layer 72 across piezoelectric layer 73. According to this embodiment, lower electrode layer 72 contains platinum (Pt). Piezoelectric layer 73 is made of lead zirconate titanate (PZT). Upper electrode layer 74 contains titanium (Ti) and gold (Au). Each of wiring pattern 29, the driving electrodes, the sensing electrodes, and the monitor electrodes is implemented by upper electrode layer 74. The driving electrodes, the sensing electrodes, and the monitor electrodes have widths larger than that of wiring pattern 29.

Bent section 32, sensing-electrode vibrating segment 34, driving-electrode vibrating segment 36, driving-electrode vibrating segment 56, sensing-electrode vibrating segment 54, bent section 51, bent section 60, sensing-electrode vibrating segment 62, driving-electrode vibrating segment 64, driving-electrode vibrating segment 45, sensing-electrode vibrating segment 43, and bent section 41 are coupled in this order from end 28B of connection beam 28 to constitute a loop shape. This configuration has a weight balance with respect to fixing section 21 in all directions surrounding fixing section 21, and thus, can accurately drive driving-electrode vibrating segments 36, 45, 56, and 64 to vibrate, thereby providing an accurate output signal.

Sensing-electrode vibrating segment 34 is arranged point-symmetrically to sensing-electrode vibrating segment 62 with respect to fixing section 21. Sensing-electrode vibrating segment 54 is arranged point-symmetrically to sensing-electrode vibrating segment 43 with respect to fixing section 21. Thus, upon having the Coriolis force due to the angular velocity applied, sensing-electrode vibrating segments 34 and 62 deform point-symmetrically to each other with respect to fixing section 21. Similarly, sensing-electrode vibrating segments 54 and 43 deform point-symmetrically to each other with respect to fixing section 21. This deforming provides an accurate output signal.

Figure 5:
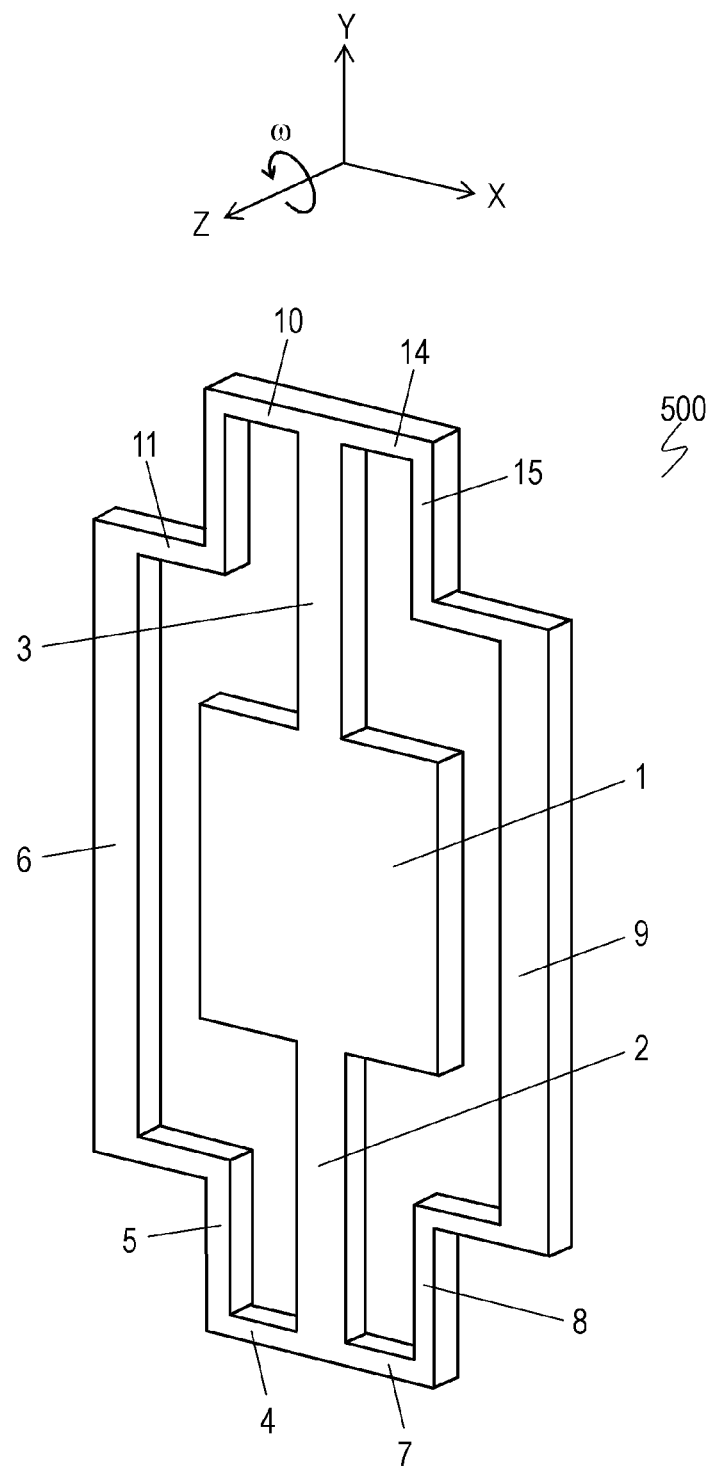
FIG. 5 is a perspective view of a conventional angular velocity sensor.

In conventional angular velocity sensor 500 shown in FIG. 5, sensing-electrode vibrating segments 2 and 3 are directly connected to fixing section 1. Thus, sensing-electrode vibrating segments 2 and 3 are prevented from being driven to vibrate, thus reducing an output signal caused by a Coriolis force.

In angular velocity sensor 1000 in accordance with the embodiment, sensing-electrode vibrating segments 34, 43, 54, and 62 are coupled to fixing section 21 via connection beams 28 and 31. Sensing-electrode vibrating segments 34, 43, 54, and 62 are not connected directly to fixing section 21. Therefore, sensing-electrode vibrating segments 34, 43, 54, and 62 are easily driven to vibrate, thus providing an output signal with a high sensitivity.

A method of manufacturing angular velocity sensor 1000 in accordance with the embodiment will be described below. FIGS. 2A to 2D are perspective views of angular velocity sensor 1000 for illustrating the method of manufacture angular velocity sensor 1000.

Figure 2A:
FIG. 2A is a perspective view of a substrate of the angular velocity sensor in accordance with the embodiment for illustrating a method of manufacturing the angular velocity sensor.
Figure 2B:
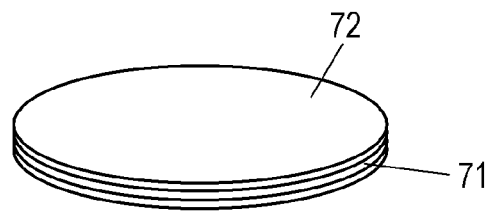
FIG. 2B is a perspective view of the substrate of the angular velocity sensor in accordance with the embodiment for illustrating a method of manufacturing the angular velocity sensor.
Figure 2C:
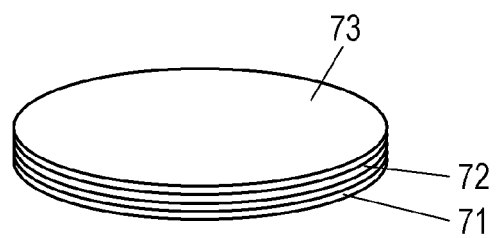
FIG. 2C is a perspective view of the substrate of the angular velocity sensor in accordance with the embodiment for illustrating a method of manufacturing the angular velocity sensor.

First, substrate 71 made of Si shown in FIG. 2A is prepared. As shown in FIG. 2B, lower electrode layer 72 made of thin alloy film containing Pt and Ti is formed entirely on an upper surface of substrate 71 by vapor deposition. Lower electrode layer 72 functions as a common grounding electrode. Next, as shown in FIG. 2C, piezoelectric layer 73 made of PZT thin film is formed entirely on an upper surface of lower electrode layer 72 by vapor deposition.

Figure 2D:
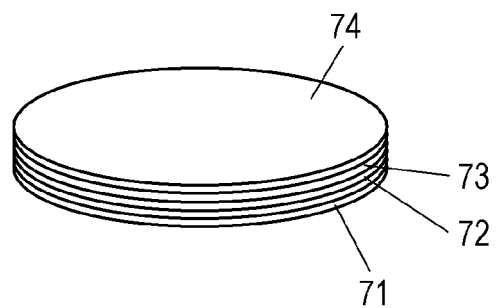
FIG. 2D is a perspective view of the substrate of the angular velocity sensor in accordance with the embodiment for illustrating a method of manufacturing the angular velocity sensor.

Next, as shown in FIG. 2D, upper electrode layer 74 made of thin alloy film containing Ti and Au is formed entirely on an upper surface of piezoelectric layer 73 by vapor deposition. Then, unnecessary portions of lower electrode layer 72, piezoelectric layer 73, and upper electrode layer 74 are removed to provide a predetermined shape. Driving electrodes 38, 39, 47, 48, 58, 59, 66, and 77, sensing electrodes 33, 42, 52, 61, 35, 44, 55, and 63, and monitor electrode 30 made of upper electrode layer 74 are formed on the upper surface of piezoelectric layer 73.

Next, a voltage is applied to lower electrode layer 72. Monitor electrode 30, driving electrodes 38, 39, 47, 48, 58, 59, 66, and 77, and sensing electrodes 33, 42, 52, 61, 35, 44, 55, and 63 are grounded, thereby polarizing piezoelectric layer 73.

Next, an unnecessary portion in substrate 71 is removed to provide individual angular velocity sensor 1000.

Figure 3:
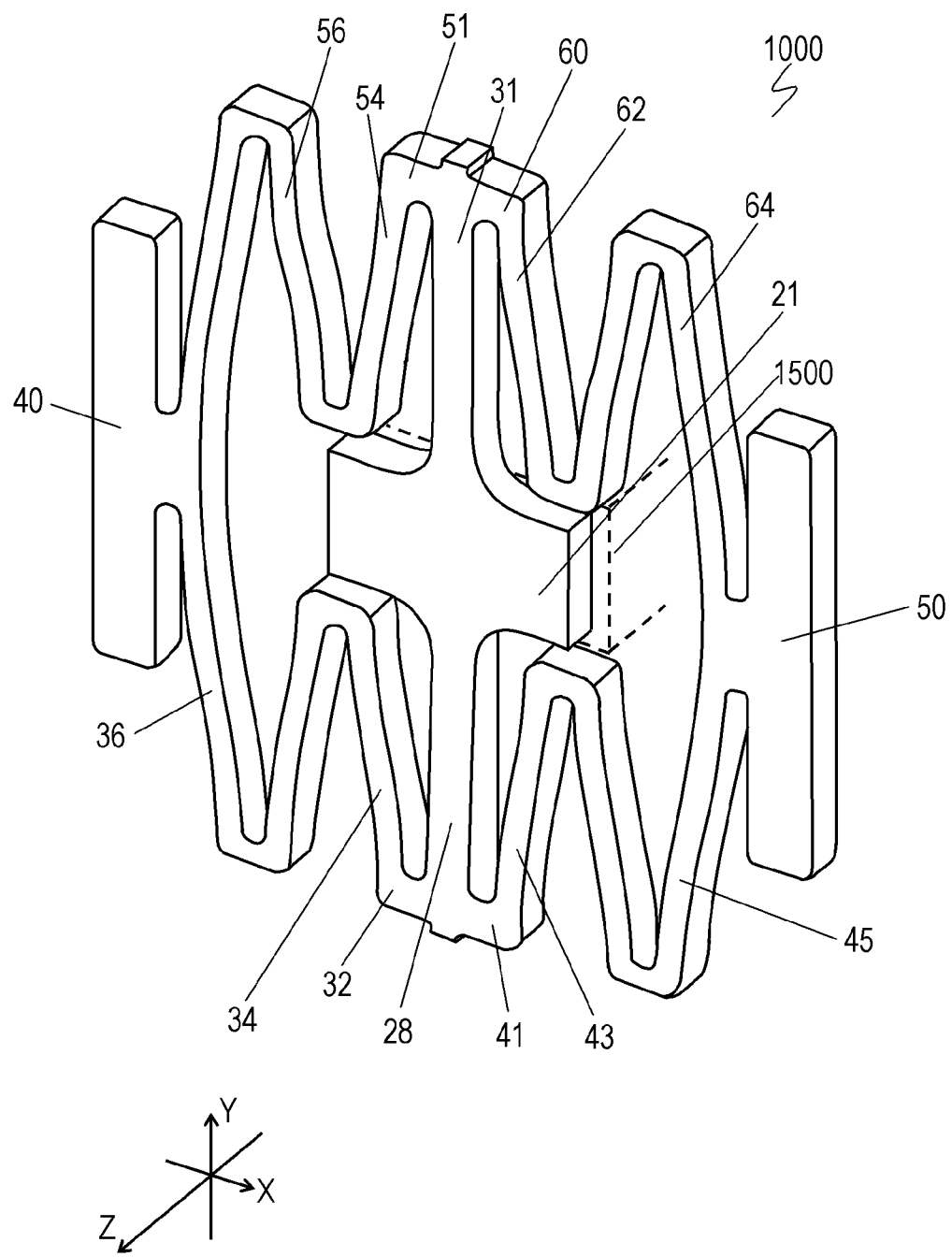
FIG. 3 is a perspective view of the angular velocity sensor in accordance with the embodiment for illustrating an operation of the angular velocity sensor.
Figure 4:
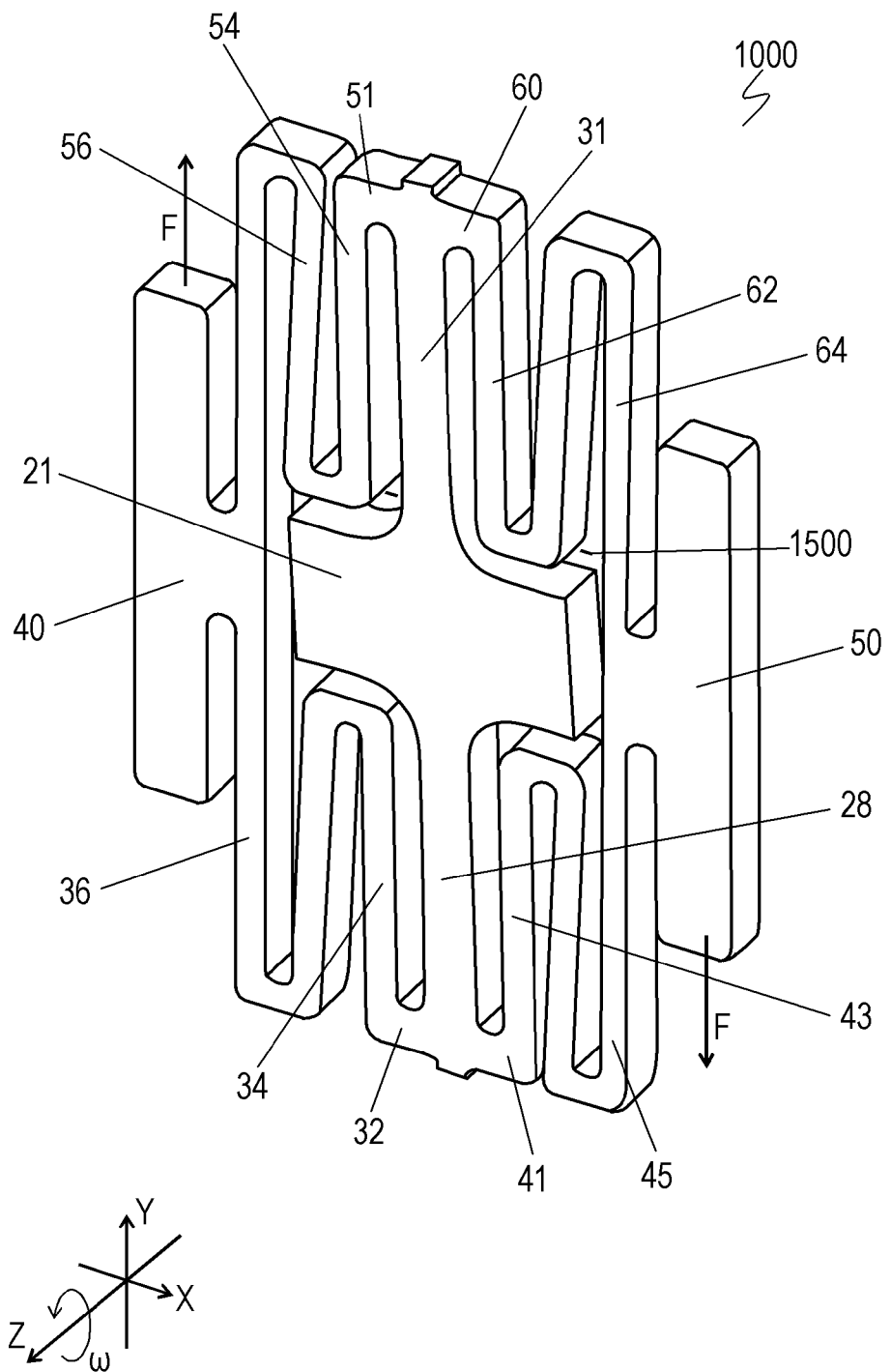
FIG. 4 is a perspective view of the angular velocity sensor in accordance with the embodiment for illustrating the operation of the angular velocity sensor.

Next, an operation of angular velocity sensor 1000 manufactured by the above method in accordance with the embodiment will be described below. FIGS. 3 and 4 are perspective views of angular velocity sensor 1000 for illustrating the operation of angular velocity sensor 1000.

Upon having an alternating-current (AC) voltage applied to driving electrodes 38, 39, 47, 48, 58, 59, 66, and 67 provided on driving-electrode vibrating segments 36, 45, 56, and 64, each of piezoelectric layers contacting driving electrodes 38, 39, 47, 48, 58, 59, 66, and 67 has a tension stress applied thereto when the direction of the voltage is identical to a direction of the polarization. On the other hand, each of the piezoelectric layers has a compression stress applied thereto when the direction of the AC voltage is opposite to the direction of the polarization. Thus, depending on the phase of the AC voltage, as shown in FIG. 3, driving-electrode vibrating segments 36 and 45 are driven to vibrate in directions opposite to each other at velocity V and driving-electrode vibrating segments 56 and 64 are driven to vibrate in directions opposite to each other at velocity V. As a result, plummets 40 and 50 vibrate to be displaced in directions opposite to each other along the X-axis. When angular velocity ω about the Z-axis is applied to object 1500, angular velocity sensor 1000 fixed to object 1500 via fixing section 21 rotates at angular velocity ω about the Z-axis perpendicular to fixing section 21, i.e., to a plane having angular velocity sensor 1000 provided thereon. When angular velocity sensor 1000 rotates at angular velocity W, as shown in FIG. 4, sensing-electrode vibrating segments 34, 43, 54, and 62 has Coriolis force F (=2 mV×ω) applied thereto. Coriolis force F generates a bending moment in bent sections 32, 41, 51, and 60. Angular velocity sensor 1000 is configured to detect angular velocity ω by outputting a charge generated in sensing electrodes 33 and 35 on bent section 32 via land 24 on fixing section 21 to outside of sensor 1000 and by outputting a charge generated in sensing electrodes 42 and 44 on bent section 41 via land 25 on fixing section 21 to outside of sensor 1000. Angular velocity sensor 1000 also can detect angular velocity ω by outputting a charge generated in sensing electrodes 52 and 55 on bent section 51 via land 53 on fixing section 21 to outside of sensor 1000 and by outputting a charge generated in sensing electrodes 61 and 63 on bent section 60 via land 24 on fixing section 21 to outside of sensor 1000.

In angular velocity sensor 1000 in accordance with the embodiment, Coriolis force F is increased by the mass of plummet 40 connected to ends 36B and 56B of driving-electrode vibrating segments 36 and 56 and the mass of plummet 50 connected to ends 45B and 64B of driving-electrode vibrating segments 45 and 64. As a result, angular velocity sensor 1000 can provide an output signal with a high sensitivity.

Furthermore, in angular velocity sensor 1000 in accordance with the embodiment, sensing-electrode vibrating segments 34 and 43 extend in directions X2 and X1 opposite to each other from another end 28B at the outer periphery of connection beam 28, respectively. Sensing-electrode vibrating segments 54 and 62 extend in directions X2 and X1 opposite to each other from another end 31B at the outer periphery of connection beam 31, respectively. Furthermore, driving-electrode vibrating segments 36, 45, 56, and 64 are coupled to constitute the loop shape. This configuration allows the driving vibration of sensing-electrode vibrating segments 34, 43, 54, and 62 to occur from the outer periphery of the entire shape of angular velocity sensor 1000. Sensing-electrode vibrating segments 34, 43, 54, and 62 as well as driving-electrode vibrating segments 36, 45, 56, and 64 are prevented from being displaced in a direction along which Coriolis force F perpendicular to the driving vibration direction acts. Thus, the driving vibration can be stabilized.

In angular velocity sensor 1000 in accordance with the embodiment, the length of connection beam 28 in the longitudinal direction and the cross-sectional shape of connection beam 28 are identical to the length of connection beam 31 in the longitudinal direction and the cross-sectional shape of connection beam 31, respectively. Thus, when Coriolis force F occurs, connection beams 28 and 31 warp by the substantially same amount. As a result, sensing-electrode vibrating segments 34, 43, 54, and 62 and driving-electrode vibrating segments 36, 45, 56, and 64 which are coupled to constitute the loop shape deform with respect to fixing section 21 while maintaining the point-symmetrical shape, thus providing an accurate output signal.

As described above, angular velocity sensor 1000 is configured to detect angular velocity ω applied to object 1500. Angular velocity sensor 1000 includes fixing section 21, connection beams 28 and 31, double-end-supported beams 201 and 202, driving electrodes 38 and 47 (39, 48, 58, 59, 66, 67), and sensing electrodes 35 and 44. Fixing section 21 is configured to be fixed to object 1500. Connection beam 28 has one end 28A and another end 28B opposite to one end 28A. One end 28A of connection beam 28 is connected to fixing section 21. Connection beam 31 has one end 31A and another end 31B opposite to one end 31A. One end 31A of connection beam 31 is connected to fixing section 21. Connection beam 31 extends opposite to connection beam 28. Double-end-supported beam 201 has one end 201A and another end 201B. One end 201A of double-end-supported beam 201 is connected to another end 28B of connection beam 28. Another end 201B of double-end-supported beam 201 is connected to another end 31B of connection beam 31. Double-end-supported beam 201 extends such that double-end-supported beam 201 and connection beams 28 and 31 surround one side surface 21A of fixing section 21. Double-end-supported beam 202 has one end 202A and another end 202B. One end 202A of double-end-supported beam 202 is connected to another end 28B of connection beam 28. Another end 202B of double-end-supported beam 202 is connected to another end 31B of connection beam 31. Double-end-supported beam 202 extends such that double-end-supported beam 202 and connection beams 28 and 31 surround another side surface 21B of fixing section 21 opposite to one side surface 21A of fixing section 21. Driving electrode 38 (39, 58, and 59) is provided at double-end-supported beam 201 and is configured to vibrate double-end-supported beam 201. Sensing electrode 35 is provided at double-end-supported beam 201 and is configured to detect a vibration of double-end-supported beam 201. Driving electrode 47 (48, 66, 67) is provided at double-end-supported beam 202 and is configured to vibrate double-end-supported beam 202. Sensing electrode 44 is provided at double-end-supported beam 202 and is configured to detect a vibration of double-end-supported beam 202.

Angular velocity sensor 1000 may further include sensing electrodes 55 and 63. Sensing electrode 55 is provided at double-end-supported beam 201 and is configured to detect a vibration of double-end-supported beam 201. Sensing electrode 63 is provided at double-end-supported beam 202 and is configured to detect a vibration of double-end-supported beam 202. Double-end-supported beam 201 has sensing-electrode vibrating segment 34 including sensing electrode 35, sensing-electrode vibrating segment 54 including sensing electrode 55, and driving-electrode vibrating segment 36 (56) including driving electrode 38 (58) provided at double-end-supported beam 201. Sensing-electrode vibrating segment 34 has one end 34A and another end 34B opposite to end 34A. One end 34A of sensing-electrode vibrating segment 34 is coupled to another end 28B of connection beam 28. Sensing-electrode vibrating segment 34 extends in longitudinal direction Y1 along which connection beam 28 extends. Sensing-electrode vibrating segment 54 has one end 54A and another end 54B opposite to end 54A. One end 54A of sensing-electrode vibrating segment 54 is coupled to the other end 31B of connection beam 31. Sensing-electrode vibrating segment 54 extends in longitudinal direction Y1 along which connection beam 31 extends. Driving-electrode vibrating segment 36 (56) has one end 36A and another end (56A). One end 36A of driving-electrode vibrating segment 36 (56) is connected to another end 34B of sensing-electrode vibrating segment 34. Another end (56A) of driving-electrode vibrating segment 36 (56) is connected to another end 54B of sensing-electrode vibrating segment 54. Double-end-supported beam 202 has sensing-electrode vibrating segment 43 including sensing electrode 44, sensing-electrode vibrating segment 62 including sensing electrode 63, and driving-electrode vibrating segment 45 (64) including driving electrode 47 (67) provided at double-end-supported beam 202. Sensing-electrode vibrating segment 43 has one end 43A and another end 43B opposite to end 43A. One end 43A of sensing-electrode vibrating segment 43 is coupled to another end 28B of connection beam 28. Sensing-electrode vibrating segment 43 extends in longitudinal direction Y1 along which sensing-electrode vibrating segment 34 extends. Sensing-electrode vibrating segment 62 has one end 62A and another end 62B opposite to end 62A. One end 62A of sensing-electrode vibrating segment 62 is coupled to another end 31B of connection beam 31. Sensing-electrode vibrating segment 62 extends in longitudinal direction Y2 along which sensing-electrode vibrating segment 54 extends. Driving-electrode vibrating segment 45 (64) has one end 45A and another end 64A. One end 45A of driving-electrode vibrating segment 45 (64) is connected to another end 43B of sensing-electrode vibrating segment 43. Another end 64A of driving-electrode vibrating segment 45 (64) is connected to another end (62B) of sensing-electrode vibrating segment 62.

Sensing-electrode vibrating segments 34, 43, 54, and 62 may be arranged point-symmetrically to one another with respect to fixing section 21. One end 201A of double-end-supported beam 201 and one end 202A of double-end-supported beam 202 are coupled at another end 28B of connection beam 28 such that double-end-supported beams 201 and 202 are coupled to constitute a loop shape. Another end 201B of double-end-supported beam 201 and another end 202B of double-end-supported beam 202 are coupled at another end 31B of connection beam 31.

In the embodiment, terms indicating directions, such as "upper surface" indicate relative directions depending only on a relative positional relation of components, such as a sensor base and electrodes, of the angular velocity sensor, and do not indicate absolute directions, such as a vertical direction.

INDUSTRIAL APPLICABILITY

An angular velocity sensor according to the present invention has a high output sensitivity, and is useful as an angular velocity sensor used for various electronic devices.

REFERENCE MARKS IN THE DRAWINGS 21 fixing section
28 connection beam (first connection beam)
31 connection beam (second connection beam)

34 sensing-electrode vibrating segment (first sensing-electrode vibrating segment)
35 sensing electrode (first sensing electrode)
36, 56 driving-electrode vibrating segment (first driving-electrode vibrating segment)
38, 39, 58, 59 driving electrode (first driving electrode)
40 plummet (first plummet)
43 sensing-electrode vibrating segment (third sensing-electrode vibrating segment)
44 sensing electrode (second sensing electrode)
45, 64 driving-electrode vibrating segment (second driving-electrode vibrating segment)
47, 48, 66, 67 driving electrode (second driving electrode)
50 plummet (second plummet)
54 sensing-electrode vibrating segment (second sensing-electrode vibrating segment)
55 sensing electrode (third sensing electrode)
62 sensing-electrode vibrating segment (fourth sensing-electrode vibrating segment)
63 sensing electrode (fourth sensing electrode)
201 double-end-supported beam (first double-end-supported beam)
202 double-end-supported beam (second double-end-supported beam)
1000 angular velocity sensor
1500 object

The invention claimed is:

1. An angular velocity sensor configured to detect an angular velocity applied to an object, comprising:
a fixing section configured to be fixed to the object;
a first connection beam having one end and another end, the one end of the first connection beam being connected to the fixing section;
a second connection beam having one end and another end, the one end of the second beam being connected to the fixing section, the second connection beam extending opposite to the first connection beam;
a first double-end-supported beam having one end and another end, the one end of the first double-end-supported beam being connected to the another end of the first connection beam, the another end of the first double-end-supported beam being connected to the another end of the second connection beam, the first double-end-supported beam extending such that the first double-end-supported beam, the first connection beam, and the second connection beam surround one side surface of the fixing section;
a second double-end-supported beam having one end and another end, the one end of the second double-end-supported beam being connected to the another end of the first connection beam, the another end of the second double-end-supported beam being connected to the another end of the second connection beam, the second double-end-supported beam extending such that the second double-end-supported beam, the first connection beam, and the second connection beam surround another side surface of the fixing section opposite to the one side surface of the fixing section;
a first driving electrode provided on the first double-end-supported beam and configured to vibrate the first double-end-supported beam;
a first sensing electrode provided on the first double-end-supported beam and configured to detect a vibration of the first double-end-supported beam;
a second driving electrode provided on the second double-end-supported beam and configured to vibrate the second double-end-supported beam; and
a second sensing electrode provided on the second double-end-supported beam and configured to detect a vibration of the second double-end-supported beam,
wherein the first double-end-supported beam has a first bent section,
the first sensing electrode is provided on one side of the first bent section across from the first driving electrode located on another side of the first bent section, along the first double-end-supported beam,
the second double-end-supported beam has a second bent section,
the second sensing electrode is provided on one side of the second bent section across from the second driving electrode located on another side of the second bent section, along the second double-end-supported beam.

2. The angular velocity sensor according to claim 1, further comprising:
a third sensing electrode provided at the first double-end-supported beam and configured to detect a vibration of the first double-end-supported beam, and
a fourth sensing electrode provided at the second double-end-supported beam and configured to detect a vibration of the second double-end-supported beam,
wherein the first double-end-supported beam includes:
a first sensing-electrode vibrating segment that has one end and another end, the one end of the first sensing-electrode vibrating segment being coupled to the another end of the first connection beam, the first sensing-electrode vibrating segment extending in a longitudinal direction in which the first connection beam extends, the first sensing-electrode vibrating segment having the first sensing electrode provided at the first sensing-electrode vibrating segment;
a second sensing-electrode vibrating segment having one end and another end, the one end of the second sensing-electrode vibrating segment being coupled to the another end of the second connection beam, the second sensing-electrode vibrating segment extending in a longitudinal direction in which the second connection beam extends, the second sensing-electrode vibrating segment having the third sensing electrode provided at the second sensing-electrode vibrating segment; and
a first driving-electrode vibrating segment having one end and another end, the one end of the first driving-electrode vibrating segment being connected to the another end of the first sensing-electrode vibrating segment, the another end of the first driving-electrode vibrating segment being connected to the another end of the second sensing-electrode vibrating segment, first driving-electrode vibrating segment having the first driving electrode provided at first driving-electrode vibrating segment, and
wherein the second double-end-supported beam includes:
a third sensing-electrode vibrating segment having one end and another end, the one end of the third sensing-electrode vibrating segment being coupled to the another end of the first connection beam, the third sensing-electrode vibrating segment extending in the longitudinal direction in which the first sensing-electrode vibrating segment extends, the third sensing-electrode vibrating segment having the second sensing electrode provided at the third sensing-electrode vibrating segment;
a fourth sensing-electrode vibrating segment having one end and another end, the one end of the sensing-electrode vibrating segment being coupled to the another end of the second connection beam, the sensing-electrode vibrating segment extending in an opposite direction to the longitudinal direction in which the second sensing-electrode vibrating segment extends, the sensing-electrode vibrating segment having the fourth sensing electrode provided at the sensing-electrode vibrating segment; and a second driving-electrode vibrating segment having one end and another end, the one end of the second driving-electrode vibrating segment being connected to the another end of the third sensing-electrode vibrating segment, the another end of the second driving-electrode vibrating segment being connected to the another end of the third sensing-electrode vibrating segment, the second driving-electrode vibrating segment having the second driving electrode provided at the second driving-electrode vibrating segment.

3. The angular velocity sensor according to claim 2, further comprising:

a first plummet connected to the first driving-electrode vibrating segment; and a second plummet connected to the second driving-electrode vibrating segment.

4. The angular velocity sensor according to claim 2, wherein the first sensing-electrode vibrating segment, the second sensing-electrode vibrating segment, the third sensing-electrode vibrating segment, and the fourth sensing-electrode vibrating segment are arranged point-symmetrically to one another with respect to the fixing section, and wherein the one end of the first double-end-supported beam and the one end of the second double-end-supported beam are coupled at the another end of the first connection beam, and the another end of the first double-end-supported beam and the another end of the second double-end-supported beam are coupled at the another end of the second connection beam such that the first double-end-supported beam and the second double-end-supported beam are coupled to constitute a loop shape.

5. The angular velocity sensor according to claim 1, wherein the first connection beam and the second connection beam extend slenderly in a longitudinal direction, and wherein a length of the first connection beam in the longitudinal direction and a cross-sectional shape of the first connection beam perpendicular to the longitudinal direction are substantially identical to a length of the second connection beam in the longitudinal direction and a cross-sectional shape of the second connection beam perpendicular to the longitudinal direction, respectively.

* * * * *